A. F. Hammel,
Harness,
Nº 82,830. Patented Oct. 6, 1868
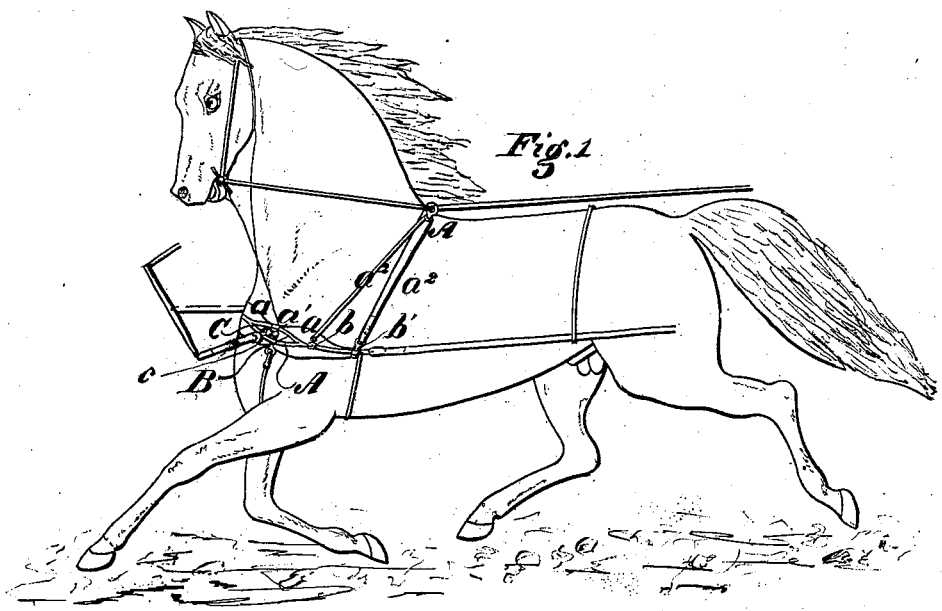
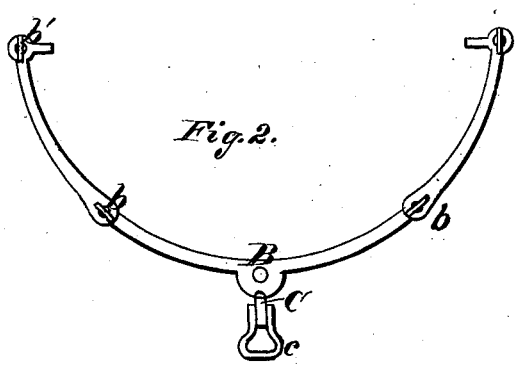
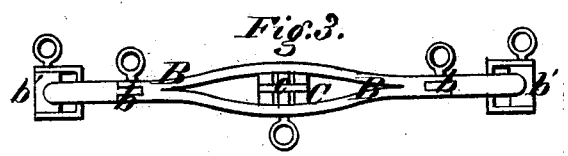

UNITED STATES PATENT OFFICE.

A. F. HAMMEL, OF ST. LOUIS, MISSOURI.

IMPROVED BREAST-YOKE FOR DOUBLE HARNESS.

Specification forming part of Letters Patent No. 82,830, dated October 6, 1868.

*To all whom it may concern:*

Be it known that I, A. F. HAMMEL, of the city and county of St. Louis, and State of Missouri, have invented a new and useful Improvement in Breast-Yokes for Double Harness with Breast-Collar; and I do hereby declare that the following is a full and clear description thereof, reference being had to the accompanying drawings, and to the letters of reference marked thereon.

This invention relates to an improvement in that kind of harness in which a breast-collar is used instead of the common neck-collar, the improvement consisting in a metallic neck or breast yoke, fitted and attached to the breast-collar of each horse, so as to form an attachment for the pole-straps or neck-yoke of a set of double harness, the said breast-yoke being jointed together in such a manner as to yield readily to the motions of the animal, thereby enabling it to be worn with ease, and without injury to the beast; and this cannot be done with any of the stiff unjointed breast-yokes now in use.

To enable those skilled in the art to make and use my improved breast-yoke, I will proceed to describe its construction and operation.

Figure 1 of the drawings is a perspective view of one of the improved breast-yoke collars fitted to a horse. Fig. 2 is a plan of the breast-yoke, and Fig. 3 is a front elevation of it.

The breast-collar A is constructed in the usual manner, with the exception of the enlargement of the shoulder-pads $a$ and the narrowing down of the central part at $a^1$, so as to relieve the wind-pipe of the animal from the pressure of the collar, and place it upon the shoulders of the beast, where it can easily be borne without detriment to respiration.

The breast-yoke B, as clearly shown in Figs. 2 and 3, is jointed at $b\ b$, so as to yield readily to right or left, as the animal may turn. The end loops $b'\ b'$ are also pivoted so as to receive a lateral play, for the same purpose. The weight of the breast-yoke is sustained by the neck-strap A', which is connected with the breast-yoke at the points of support $b\ b'$ by means of the straps $a^2$. The end loops $b'$ are attached to the sides of the breast-collar by means of short straps at points opposite, or nearly opposite, the shoulder-places, and this construction places the strain produced by drawing back on the breast-yoke almost in a right line drawn from the breeching through the loops $b'$ and the joints $b$, and no undue strain is placed upon the animal's neck. The forward part of the yoke B is divided into two branches, for the reception of the swivel C, which has a lateral motion around its pivot-points, and this swivel has a loop, $c$, for the reception of the pole-strap, pivoted to it so as to have a vertical motion. Thus it will be seen the loop $c$ has a vertical motion about its own pivot-point, and a lateral motion derived from its connection with the swivel C. These combined joints of the yoke B, its swivel C, and loop $c$ give to the breast-yoke all the flexibility demanded to render it fit for use, without injuring or worrying the animal wearing it.

Having described my invention, what I claim is—

1. The collar A and yoke B, jointed at $b$ and $b'$, when combined and arranged substantially as described.

2. The swivel C $c$, in combination with the breast-yoke B, as and for the purpose set forth.

A. F. HAMMEL.

Witnesses:
M. RANDOLPH,
GEO. P. HERTHEL, Jr.